United States Patent [19]

Hamano et al.

[11] Patent Number: 4,516,443
[45] Date of Patent: May 14, 1985

[54] RESTRICTION DEVICE FOR DIFFERENTIAL GEAR

[75] Inventors: Hideo Hamano; Yasunori Koga, both of Toyota, Japan

[73] Assignee: Toyota Jidosha Kogyo Kabushiki Kaisha, Toyota, Japan

[21] Appl. No.: 345,392

[22] Filed: Feb. 3, 1982

[30] Foreign Application Priority Data

Feb. 9, 1981 [JP] Japan .............................. 56-16945[U]

[51] Int. Cl.³ .......................... F16H 1/44; F16D 13/60
[52] U.S. Cl. ...................................... 74/711; 74/710.5;
192/56 R; 192/70.14; 192/107 M; 192/113 B
[58] Field of Search ............... 74/710, 711, 710.5, 74/713; 192/66, 48.1, 107 R, 107 M, 70.12, 70.14, 56 R, 113 B

[56] References Cited

U.S. PATENT DOCUMENTS

| | | | |
|---|---|---|---|
| 3,233,477 | 2/1966 | O'Brien | 74/710.5 |
| 3,390,593 | 7/1968 | Brownyer | 74/710.5 |
| 3,495,298 | 2/1970 | Engle et al. | 74/711 X |
| 3,624,717 | 11/1971 | Brubaker | 74/711 |
| 3,628,399 | 12/1971 | Seitz | 74/711 |
| 3,648,545 | 3/1972 | Clancey | 74/710.5 |
| 3,815,442 | 6/1974 | McAninch et al. | 74/710.5 X |
| 3,893,191 | 7/1975 | Gold et al. | 192/18 B X |
| 3,896,684 | 7/1975 | Duer | 74/713 X |
| 3,927,241 | 12/1975 | Augustin | 192/107 M X |
| 3,948,364 | 4/1976 | Lowey | 192/107 M X |
| 3,967,037 | 6/1976 | Marzocchi et al. | 192/107 M X |
| 4,245,525 | 1/1981 | Le Begue | 74/711 |
| 4,249,397 | 2/1981 | Guerra | 64/29 |
| 4,280,609 | 7/1981 | Cruise | 192/70.12 X |
| 4,290,510 | 9/1981 | Warren | 192/107 M X |

*Primary Examiner*—Allan D. Herrmann
*Assistant Examiner*—Joseph M. Rolnicki
*Attorney, Agent, or Firm*—Oblon, Fisher, Spivak, McClelland & Maier

[57] ABSTRACT

A restriction device for a differential gear having multiplate clutches which are formed by first friction plates fixed to a pair of side gears installed inside of a differential casing and second friction plates fixed to the differential casing. The first and second friction plates are alternately situated and are in contact with each other, wherein one of the frictional faces of the friction plates is treated by cold rolling while the other is coated with a self-lubricating agent so as to minimize the tendency of increasing differential movement of both side gears.

8 Claims, 8 Drawing Figures

RESTRICTION DEVICE FOR DIFFERENTIAL GEAR

BACKGROUND OF THE INVENTION

This invention relates generally to a device for restricting at all times differential movement of side gears of a differential gear for an automobile, and more particularly to a restriction device for a differential gear of the type wherein prebiasing springs are disposed between the opposite inner end surfaces of each side gear in a differential casing and multi-plate clutches are provided between the outer cylindrical surfaces of each side gear and the inner surface of the differential casing such that each plate of the multi-plate clutches comes into strong contact with each other and creates frictional resistance among each adjacent plate by resilient force of the springs.

The restrictive performance of differential movement by the multi-plate clutches in such a restriction device of differential gear employing prebiasing springs is greatly dependent upon the resilient force of the prebiasing spring. Accordingly, when the wear amount of each friction plate forming the multi-plate clutches is large, the resilient force of the prebiasing springs is changed or decreased, and as the result, the frictional torque of the multi-plate clutches is changed or decreased.

In the case of a restriction device for a differential gear not employing prebiasing springs, when the wear amount of each friction plate forming the multi-plate clutches is large, wear particles exist on the friction plates. This causes undesired noise to be created in a differential gear.

SUMMARY OF THE INVENTION

Accordingly, it is an object of the present invention to provide a restriction device for differential gear which reduces the amount of wear of each friction plate, thereby minimizing variations or decreasing the frictional torque of the multi-plate clutches relative to the mileage of an automobile and eliminating the possible creation of undesired noises.

One feature of the present invention is that the contacting faces of each adjacent frictional plate forming the multiplate clutches comprises the combination of a face treated by cold rolling and a face coated with a self-lubricating agent.

Various general and specific objects, advantages and aspects of the invention will become apparent when reference is made to the following detailed description of the invention considered in conjunction with the related accompanying drawings.

DETAILED DESCRIPTION OF THE PREFERRED EMBODIMENTS

Figure 1:
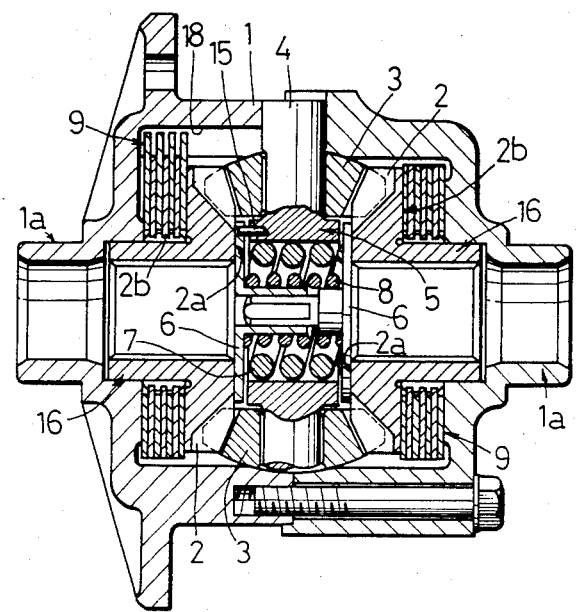
FIG. 1 is a sectional view of the essential part of the differential gear providing a prebiasing type of restriction device according to the present invention.

Referring now to FIG. 1, a differential casing 1 is rotatably supported at sleeve portions 1a formed at its both ends thereof by a differential carrier (not shown) through bearings. A ring gear (not shown) is fixed on the outer circumference of the differential casing 1 as is well known. Torque is transmitted from the ring gear to the differential casing 1 and the differential casing 1 is rotated about the axis of the sleeve portions 1a. A pair of side gears 2 and a pair of or dual pair of pinions 3 are meshed with each other in the interior of the differential casing 1. An axle shaft (not shown) is inserted into each sleeve portion 1a of the differential casing 1 and the inner end portion of each axle shaft is fixedly engaged with each side gear 2 by a serration or other means.

Each pinion 3 is rotatably supported on a pinion shaft 4 which is supported by the differential casing 1 at opposite both ends. The central portion of the pinion shaft 4 includes a ring-like retainer portion 5, and disk-like spring receiving members 6 are interposed between the side ends of the retainer portion 5 and the inner ends 2a of each side gear 2. One of the spring receiving members 6 has a sleeve integrally formed at its central portion which is engaged with an axial portion formed along the central portion of the other spring receiving member 6. Both of the spring receiving members 6 are relatively movable in the axial direction and integrally rotatable. One of the spring receiving members 6, which is positioned at the left-hand side in FIG. 1, is fixed to the retainer portion 5 by a pin 15 so as to prevent rotation relative to the retainer portion 5. Prebiasing coil springs 7 and 8 having a large diameter and a small diameter, respectively, are housed in the retainer portion 5. The prebiasing springs 7 and 8 serve to bias each side gear 2 through the spring receiving members 6 in the right and left directions. In the case of a differential gear of a four-pinion type, there are provided four pinions 3 to form a cross-shaped pinion shaft 4.

Figure 2:
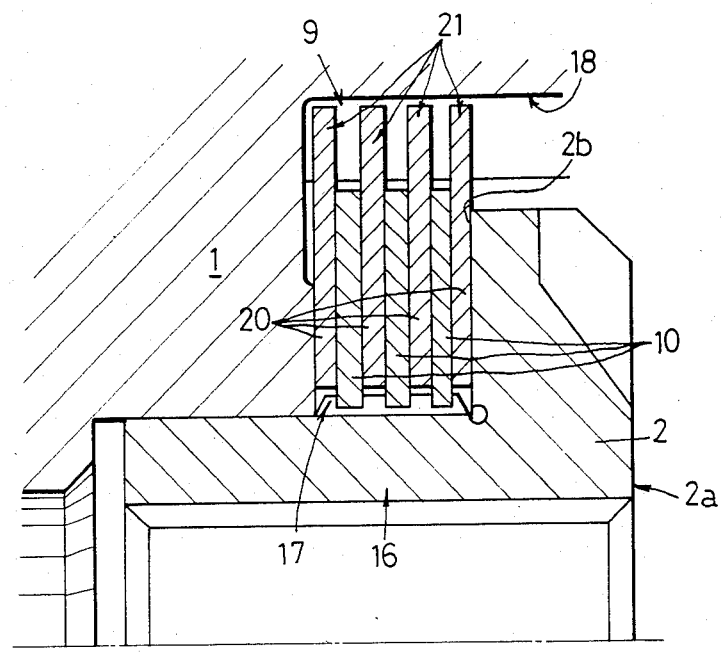
FIG. 2 is an enlarged sectional view of a part of FIG. 1.
Figure 3:
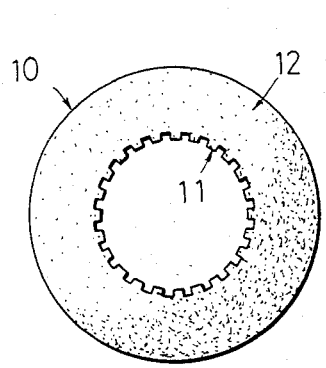
FIGS. 3 and 4 are plan views of a pair of friction plates.
Figure 4:
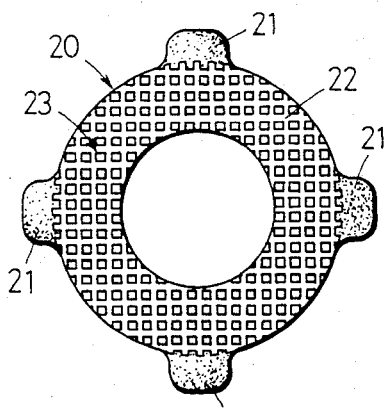

Multi-plate clutches 9 are provided between the cylindrical portions 16 of side gears 2 and the inside surfaces of the differential casing 1 which are opposed to the cylindrical portions 16 of side gears 2. As should be apparent from FIG. 2, the multiplate clutches 9 consist of friction plates 10 which are fixedly engaged with the side gears 2 so as to effectively prevent rotation relative to the side gears 2, and friction plates 20 which are fixedly engaged with the inner surface of the differential casing 1. The friction plates 10 and 20 are alternately arranged. As shown in FIG. 3, the central hole of the friction plates 10 is provided with an inner spline 11 which is engaged with an outer spline 17 formed on the outer circumference of the cylindrical portion 16 of the side gear 2. As shown in FIG. 4, a plurality of or preferably four projections 21, which are positioned in equally spaced apart relation, are provided on the outer circumference of the friction plate 20. The projections 21 are engaged with grooves 18 defined inside of the casing 1 (see the multiplate clutches illustrated at the left side in FIG. 1). Each of the friction plates 10 and 20 is slidable in the axial direction of each side gear 2 and rotatable along with the side gears 2 or casing 1. The frictional faces 12 and 22 of the friction plates 10 and 20 are retained to press fit with each other by the resilient forces of the prebiasing springs 7 and 8 acting on each side gear 2. As the result, each side gear 2 is subjected to a frictional resistance which serves to restrict the differential movement by the multi-plate clutches 9.

Each of the friction plates 10 and 20 forming the multiplate clutches 9 is made of metal and the frictional face 12 of the friction plate 10 is treated by cold rolling, while the frictional face 22 of the friction plate 20 is provided with lattice-shaped oil grooves 23 formed by forging or other method (see FIG. 4). After the oil grooves 23 are formed on the frictional face 22, the face 22 is machined and coated with a self-lubricating agent. The process of the self-lubricating coating is performed in such a manner that an agent containing molybdenum particles or graphite particles is coated on the frictional face and then heated at a constant temperature so as to be baked or fixed by other means. In this case, in order to improve adhesion of the coating, the surface of the frictional face 22 is required to be roughened by etching or another method. The oil grooves 23 of the frictional face 22 may be omitted, and in this case, the face 22 may be treated by cold rolling in the same manner as the face 10 and coated with the self-lubricating agent. The reason why the frictional face 22 is machined is to remove projections or burrs formed on the face during forging of the oil grooves 23, and as a result, when the oil grooves 23 are omitted, machining of the face is not necessary.

Figure 5:
FIGS. 5 through 7 are illustrative views of the surface roughness of a machined face, a cold rolled face and a surface treated face, respectively.
Figure 6:
Figure 7:
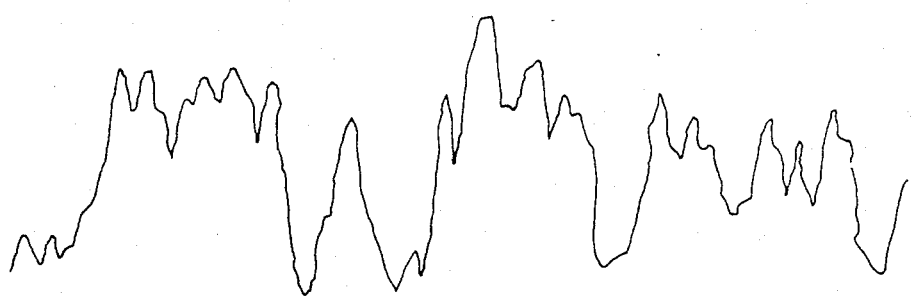

According to the embodiment as above described, the frictional face 12 of the friction plates 10 which are fixed to the side gears 2 are treated by cold rolling which is inexpensive and is as shown in FIG. 6, the wave shape indicating the surface roughness (the sectional curve of the frictional face), which is different from that of the machined face as shown in FIG. 5, is relatively flat. Furthermore, the wave shape of the cold-rolled face does not include such regular winding as seen in the wave shape of the machined face. This is advantageous in properly contacting the frictional face 12 of the friction plate 10 with the frictional face 22 of the friction plate 20 as hereinafter described. The frictional face 22 of the friction plate 20 which is fixed to the differential casing 1 is coated with the self-lubricating agent and the wave shape indicating the surface roughness is rounded at the top of the curve as shown in FIG. 7. As the result, the surface of the frictional face is extremely smooth and fits with the frictional face 12 of the friction plate 10 because the coating is softer than the frictional face 12.

As should be apparent from the aforementioned description, by combining the friction plate 10 having the frictional face 12 characterized by the wave shape of the surface roughness as shown in FIG. 6 and the friction plate 20 having the frictional face 22 characterized by the wave shape of the surface roughness as shown in FIG. 7, the wear amount of the frictional faces which are in contact with each other may be extremely reduced. This results from the fact that the wave shape of the surface roughness of the frictional faces 12 and 22 is substantially flat, thereby reducing the surface roughness, and the fact that wave shape of the frictional face 12 does not include a regular winding, thereby providing proper contact of both the frictional faces 12 and 22. When the wear amount of each friction plate 20 is reduced, the variation or the decrease in the frictional torque of the multi-plate clutches 9 which depends on the resilient force of the prebiasing springs 7 and 8 as aforementioned is reduced, thereby providing a substantially constant frictional torque characteristic.

Figure 8:
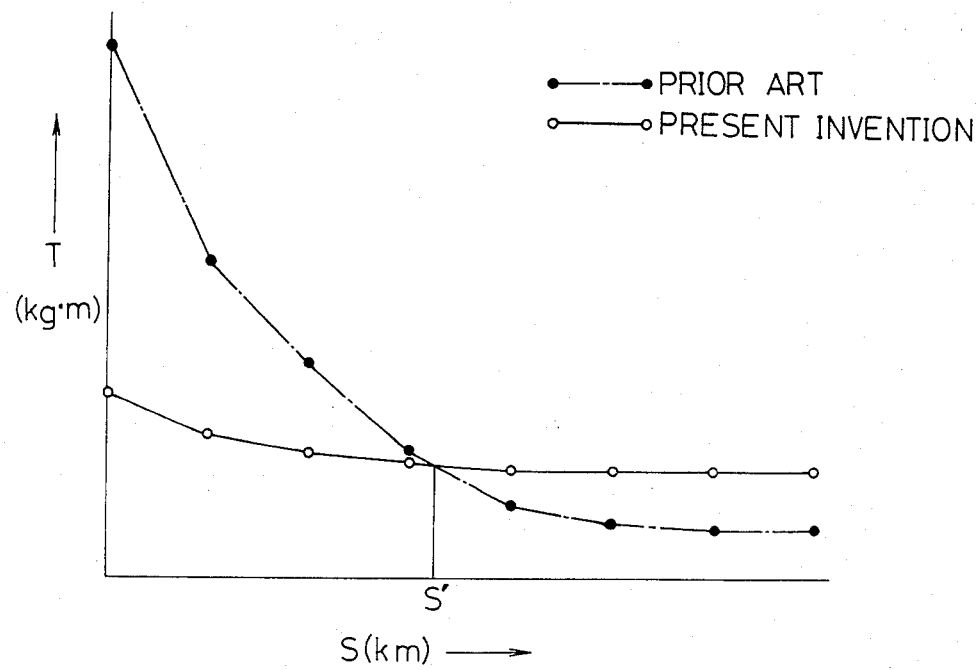
FIG. 8 is a graph comparing the characteristics of the restirction device for a differential gear of the prior art with that in the present invention with respect to the relation between the frictional torque of the multi-plate clutches and the mileage of an automobile.

In comparison with the restriction device for differential gear employing the multi-plate clutches 9 which constitutes the friction plates 10 and 20 of this embodiment and that employing the multi-plate clutches which constitutes the friction plates whose faces are machined in the prior art, the frictional torque of the respective multi-plate clutches was measured by performing an actual vehicle test. The results are shown in FIG. 8. The vertical axis shows a frictional torque T (kg.m) of the multi-plate clutch of the differential gear and the horizontal axis shows the mileage S (km) of the vehicle. The solid line illustrates the case of the preferred embodiment and the dotted line illustrates the case of the prior art. As should be apparent from the graph in FIG. 8, the multi-plate clutches 9 of the present embodiment provide a substantially constant frictional torque irrespective of the mileage S and develops a higher and more stable frictional torque characteristic than that of the prior art over the mileage S'.

The frictional face 22 of the friction plate 20 fixed to the casing 1 may be treated by cold rolling and the frictional face 12 of the friction plate 10 fixed to the side gear 2 may be coated with a self-lubricating agent. In the case where the machinability of the frictional face is ignored, one of either the frictional face of the friction plates 10 and 20 may be made by cold rolling and the other may be coated with a self-lubricating agent, thereafter combining these frictional faces in the same manner as is described above so as to provide multi-plate clutches.

Although some preferred embodiments of the invention have been disclosed and described, it is apparent that other embodiments and modifications of the invention are possible within the scope of the appended claims.

What is claimed is:

1. A differential gear for an automobile, comprising:
   a differential casing;
   a pair of side gears;
   first and second pinions, said side gears and said pinions being meshed with each other;
   a plurality of multi-plate clutches provided between cylindrical portions of said side gears and inner surfaces of said differential casing for restricting differential movement of said side gears in said differential casing, wherein said multiplate clutches further comprise a plurality of first friction plates fixed to said side gears and a plurality of second friction plates fixed to said differential casing, each of said first and second friction plates being alternately disposed so as to contact with each other and form at least first and second opposing frictional faces; and
   means for restricting differential movement of said side gears wherein said first opposing friction face includes a cold rolled face and the second opposing face includes a self-lubricating agent coated face having a plurality of lattice-shaped oil grooves formed thereon and wherein said agent contains molybdenum particles.

2. The device as defined in claim 1 wherein the frictional face of each of said plurality of first friction plates further comprises a first and second cold rolled face.

3. The device as defined in claim 1 wherein the frictional face of each of said plurality of second friction plates further comprises a first and second self-lubricating agent coated face.

4. The device as defined in claim 1 wherein one of either of the frictional faces of said first friction plate includes a cold rolled face and the other frictional face of said first friction plate includes a self-lubricating agent coated face.

5. A differential gear for an automobile, comprising:
a differential casing;
a pair of side gears;
first and second pinions, said side gears and said pinions being meshed with each other;
a plurality of multi-plate clutches provided between cylindrical portions of said side gears and inner surfaces of said differential casing for restricting differential movement of said side gears in said differential casing, wherein said multi-plate clutches further comprise a plurality of first friction plates fixed to said side gears and a plurality of second friction plates fixed to said differential casing, each of said first and second friction plates being alternately disposed so as to contact with each other and form at least first and second opposing frictional faces; and
means for restricting differential movement of said side gears wherein said first opposing friction face includes a cold rolled face and the second opposing face includes a self-lubricating agent coated face having a plurality of lattice-shaped oil grooves formed thereon and wherein said agent contains graphite particles.

6. The device as defined in claim 5 wherein the frictional face of each of said plurality of first frictional plates further comprise a first and second cold rolled face.

7. The device as defined in claim 5 wherein the frictional face of each of said plurality of second friction plates further comprise a first and second self-lubricating agent coated face.

8. The device as defined in claim 5 wherein one of either of the frictional faces of the first friction plate includes a cold rolled face and the other frictional face of said first friction plate includes a self-lubricating agent coated face.

* * * * *